United States Patent [19]
Felix et al.

[11] 3,730,596
[45] May 1, 1973

[54] BRAKE CONTROL SYSTEM AND VEHICLE HAVING SAME

[75] Inventors: Gerardus L. Felix; Frank C. Bennett, both of London, Ontario, Canada

[73] Assignee: General Motors Corporation, Detroit, Mich.

[22] Filed: Apr. 21, 1971

[21] Appl. No.: 136,089

[52] U.S. Cl. ....................303/3, 303/13, 303/15, 188/151, 188/159
[51] Int. Cl. .............................................B60t 13/74
[58] Field of Search........................303/3, 13, 15, 17, 303/20; 188/106 P, 159, 271

[56] References Cited
UNITED STATES PATENTS
2,323,413  7/1943  Ogden..................................188/159
3,497,267  2/1970  Dobrikin ............................303/3 X

*Primary Examiner*—Milton Buchler
*Assistant Examiner*—S. D. Basinger
*Attorney*—J. L. Carpenter and Robert J. Outland

[57] ABSTRACT

A brake control system applied in a preferred embodiment to a heavy hauling vehicle having a combination of four-wheel friction brakes and dynamic brakes acting only on the rear wheels through direct connected electric traction motors. The friction brakes are air operated and may be applied by the vehicle operator at any time. However, the dynamic brakes are intended to be used as the primary braking system and are separately controlled by the vehicle operator by air actuated means of the brake control system. Because actuation of the dynamic brake involves a substantial time delay before effective dynamic braking may be obtained, the brake control is arranged so that upon operation of the dynamic brake pedal by the operator the air operated friction brakes are immediately applied to the front wheels of the vehicle to establish a controllable braking effect which continues for a predetermined period, preferably equal to the time required for effective dynamic braking of the rear wheels to be established. The system permits a full application of the friction brakes on all four wheels at any time, either separately from or in conjunction with utilization of the rear wheel dynamic braking.

4 Claims, 2 Drawing Figures

PATENTED MAY 1 1973

3,730,596

INVENTORS.
Gerardus L. Felix &
BY Frank C. Bennett

Robert J. Outland
ATTORNEY

3,730,596

BRAKE CONTROL SYSTEM AND VEHICLE HAVING SAME

FIELD OF THE INVENTION

This invention relates in one of its aspects to brake control means for inertia loads provided with a combination of friction and electric brakes, the latter being subject to delayed effectiveness upon actuation. In another aspect, the invention relates to vehicles provided with brake controls and brake means of the above-mentioned type.

DESCRIPTION OF THE PRIOR ART

It is known in the art to utilize electric drives for vehicles, wherein, for example, DC electric traction motors are connected to receive current from a generator, which may be DC or rectified AC, that is in turn driven by a prime mover, such as a diesel engine. It is also known to provide for dynamic braking of such electrically driven vehicles by utilizing the traction motors as generators and supplying the current from the traction motor armatures to resistance grids carried in the vehicle, so as to dissipate the electrical energy developed in the traction motors as heat.

In such arrangements, it is also known to vary the dynamic braking effort by varying the traction motor field excitation, such as by connecting the motor fields directly to the traction generator and controlling the current flow by varying the excitation of the generator with a controller. Such arrangements have been extensively utilized in diesel locomotives for railroad use where the dynamic brake feature is utilized primarily as a retarding or holding brake to maintain suitable maximum speeds when running down long grades, thereby preventing excessive heating and wear of the service air brakes.

When it was desired to apply an electric drive and dynamic braking system of the general character previously described to a large off-highway truck having a capacity well in excess of 100 tons and intended for use in general hauling for open pit mines and the like, it was determined that some difficulty would be encountered due to an operating characteristic of the dynamic brake system which, while causing no particular difficulty in railroad use, would not be satisfactory in the intended truck use. This stemmed from the fact that the operating conditions of the truck required considerably more rapid changes in condition from full power to dynamic braking than are required in railroad service. This was due primarily to the fact that in the truck, the dynamic brake was to be utilized as the main retarding brake for all operating conditions, with the air operated friction brake system being used only as a supplemental brake and for low speed stopping and holding of the vehicle, thereby significantly increasing the expected life of the friction brake components.

In prior locomotive systems, it was necessary when switching from a full power condition to dynamic braking to first switch out of the power mode and then wait for a period of up to ten seconds or so for the residual field in the main generator to decay before completing the connection of the main generator to the traction motor field. If this connection were to be made too soon, the high residual voltage in the generator would cause an excessive current flow through the motor fields, which would in turn cause excessive generated voltages in the traction motors and possible damage due to flashovers in the traction motor armatures.

The present truck application requires, however, that the truck operator have nearly instantaneous control of the braking of his vehicle through the dynamic brake control. If the operator was required to wait ten seconds after actuating the dynamic brake control before effective braking of the vehicle was established, he would no doubt bypass this system in many instances and use the air operated friction brake system instead, with the result that there would be excessive wear and possibly early failure of the friction brakes in normal service.

SUMMARY OF THE INVENTION

The present invention provides a solution to the previously described problem through the provision of novel brake control means arranged so that upon actuation by the operator of the dynamic brake control, the vehicle air brakes are temporarily actuated to provide brake control during the delay period before effective dynamic braking is developed, after which the air brakes are automatically released. IN a preferred embodiment, the dynamic brake control actuates only the air brakes for the wheels which are not acted upon by the dynamic braking system, so that there will not be an excessive braking effect upon any of the wheels due to possible overlap of the effective braking of the two systems. The brake control is additionally provided with separate means for actuating the air actuated friction service brakes of all the vehicle wheels at any time, whether or not the dynamic brakes are in use.

Numerous additional features and advantages of the brake control system of this invention, as well as vehicles making use of this system, will be apparent from the following description of a preferred embodiment, taken together with the accompanying drawings. It should, however, be understood that the brake control and system combination disclosed is applicable in the same or modified form to many possible types of vehicle applications, including trucks, locomotives and the like, and, in addition, could be applied in non-vehicle applications of electric drive systems wherein an inertia load is given which might require braking. Accordingly, these and all other applications and variations of the invention are intended to be encompassed within the broader aspects of the disclosure.

DESCRIPTION OF THE PREFERRED EMBODIMENT

Figure 1:
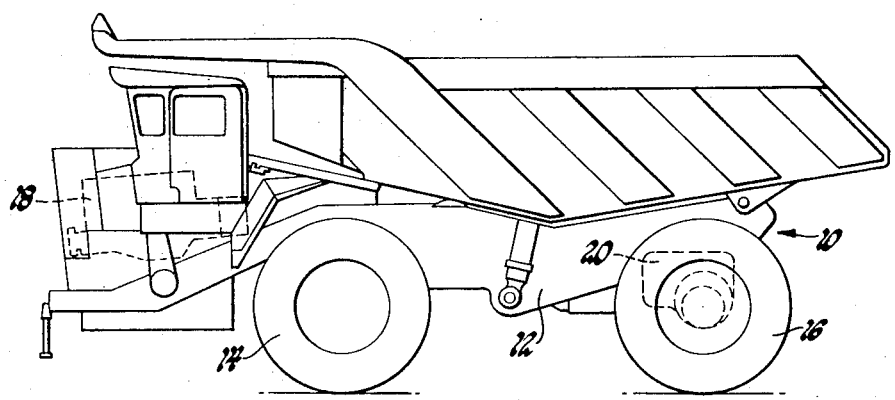
FIG. 1 is a pictorial view showing a heavy hauling truck provided with a brake system and control arrangement according to the invention.
Figure 2:
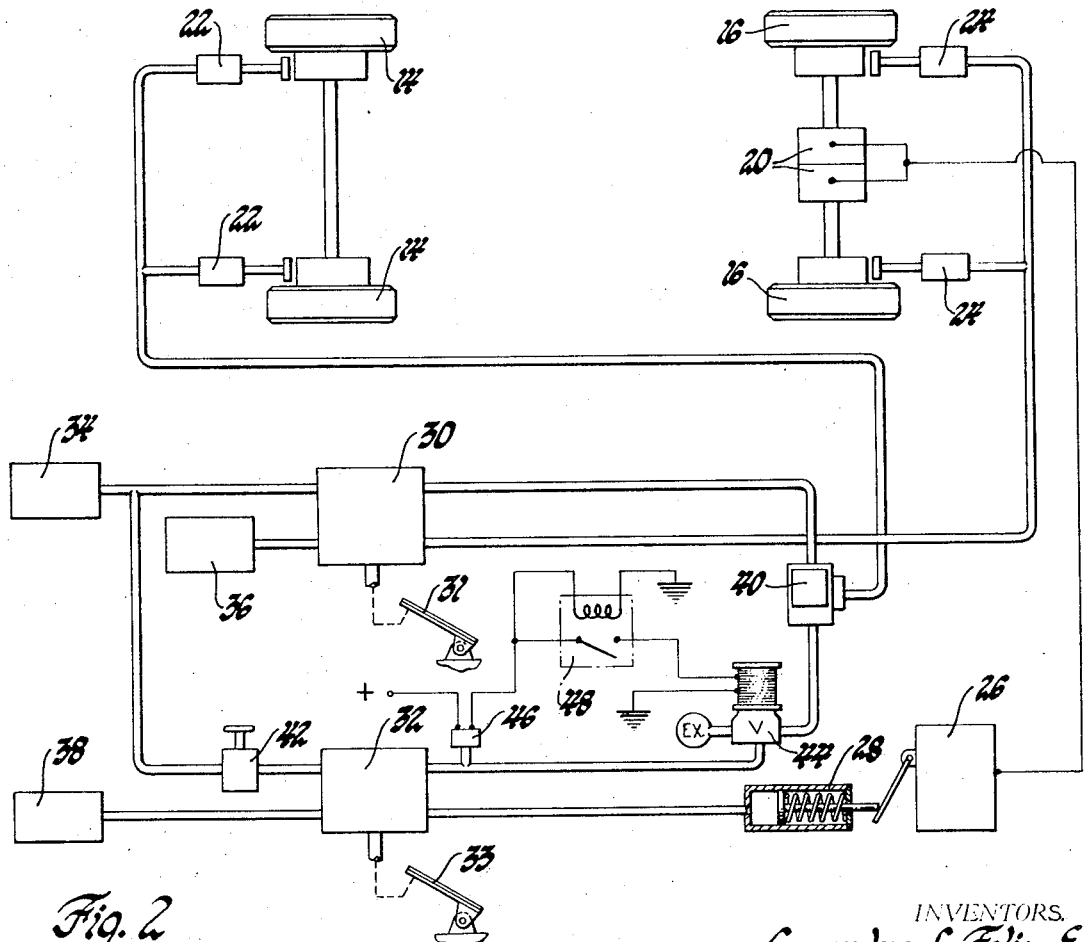
FIG. 2 is a diagrammatic view disclosing the essential components of the brake control system of the present invention as applied to the vehicle of FIG. 1.

In the drawing, numeral 10 generally indicates a heavy hauling and dump truck vehicle of a type intended for use in earthmoving operations, open pit mining and the like. Vehicle 10 includes a supporting frame 12 carried on a pair of steerable front wheels 14 and a pair of powered dual rear wheels 16. The vehicle is preferably provided with a diesel electric engine generator set 18 which provides power for a pair of rear-mounted traction motors 20 drivably connected through suitable gearing, not shown, to the rear wheels 16.

Vehicle 10 is provided with two distinct types of brake systems: an air operated service brake system and an electric brake system of the so-called dynamic brake type.

The service brake system preferably comprises conventional but extremely large friction devices of the expanding shoe type, which are mounted inside hubs of each of the vehicle wheels and are applied by means of suitable air pressure actuating means 22, 24 connected to actuate the friction brakes of the front and rear wheels, respectively.

The dynamic brakes are of conventional arrangement and utilize the traction motors 20 as means to retard rotation of the rear wheels 16 by connecting the traction motors to act as generators with their electric power output being dissipated in vehicle carried grids, not shown, and controlled through a suitable dynamic brake controller 26.

In accordance with the invention, vehicle 10 is provided with a brake actuation and control system under the control of the vehicle operator. This system includes the front and rear air brake cylinders 22, 24, as well as an additional air cylinder 28 connected to actuate the dynamic brake controller 26. Other components of the system include a service brake control valve 30 connected to a manual pedal 31 and a dynamic brake control valve 32 connected to a manual pedal 33, the pedals 31, 33 being arranged for actuation by the vehicle operator.

Three separate pressure-air reservoirs 34, 36, 38 are utilized as sources for the supply of pressure air to the brake system. Reservoir 38 supplies pressure air through brake control valve 32 directly to air cylinder 28 for actuating the dynamic brakes. Reservoir 36 supplies pressure air through brake control valve 30 directly to rear air cylinders 24 for actuating the friction brakes of the rear wheels 16. Reservoir 34 supplies air through connection with brake control valve 30 and a shuttle valve 40 to the front air cylinders 22 to actuate the friction brake means of the front wheels 14.

In addition, reservoir 34 supplies air through connection with an adjustable pressure regulator 42 to brake control valve 32, which is in turn connected through a normally open solenoid valve 44 with the shuttle valve 40 for supplying pressure air through the alternative connection to the front air cylinders 22 for actuating the friction brakes of the front wheels 14. A pressure switch 46 connected in the line between brake control valve 32 and the solenoid valve 44 is electrically connected to a time delay relay 48 which in turn connects with the solenoid valve 44.

The operation of the system is as follows: Actuation of the service brake control valve 30 by the vehicle operator delivers air at a pressure under control of the operator from reservoir 36 to rear air cylinders 24 to actuate the rear wheel friction brakes. Such action additionally operates to deliver air at an equivalent pressure from reservoir 34 through shuttle valve 40 to front air cylinders 22 to actuate the front wheel friction brakes. When the pedal 31 controlling valve 30 is released by the operator, air pressure from reservoirs 34 and 36 is cut off and the pressure air is exhausted from the front and rear air cylinders, releasing the friction brakes on both pairs of wheels.

Actuation of the dynamic brake control valve 32 by the vehicle operator operates to deliver air at controlled pressure from reservoir 38 directly to air cylinder 28 so as to initiate operation of the dynamic brakes, the subsequently developed braking effort being controllable by the vehicle operator by modulation of the brake valve 32 to control the pressure supplied. Due, however, to the nature of the dynamic brake system, there is a predetermined time delay before an effective braking effort is developed by the system.

However, the actuation by the operator of brake control valve 32 acts further to deliver pressure air from reservoir 34 through regulator 42 and valves 32, 44 and 40 to the front air cylinders 22 so as to immediately apply the front wheel friction brakes and establish an initial braking effort. The air pressure acting on pressure switch 46 closes a circuit between a voltage source, not shown, and time delay relay 48 which, after a preset time delay, closes and completes the circuit to solenoid valve 44. At this point valve 44 closes, cutting off the air supply through control valve 32 and exhausting the air pressure from brake cylinders 22, thereby releasing the front wheel friction brakes.

Preferably, the period of time delay of relay 48 is substantially equal to the time delay required before the dynamic brakes develop effective braking effort so that the front wheel friction brakes are released at substantially the same time as the dynamic brakes begin to develop effective braking effort on the rear wheels. With this arrangement, a continuous braking effort results from the time the operator actuates the dynamic brake control valve 32 until he releases it, the braking effort being supplied first by operation of the friction brake system on the front wheels and subsequently by operation of the dynamic brake system on the rear wheels. When the pedal 33 of control valve 32 is released by the operator, further supply is cut off and the valve bleeds the lines to the dynamic brake air cylinder 28, as well as to the pressure switch 46, thereby resetting the time delay circuit.

Through the pressure regulator 42, the maximum front wheel brake pressure available through actuation of the dynamic brake control pedal 33 may be regulated as desired to balance the initial braking effort with that available through the dynamic brakes. In this way, front wheel braking may be limited as desired for normal use with the dynamic brake control while full pressure emergency application of the friction brakes of all wheels may still be made through the service brake control pedal 31.

The provision of three separate air reservoirs, 34, 36, 38 as disclosed operates as a safety feature to insure the possibility of brake application through one portion of the system in spite of a failure causing loss of air pressure in another portion of the system.

Numerous changes from the illustrated embodiment are possible within the scope of the present invention. For example, a vehicle may be equipped with more than two pairs of wheels, any or all of which may be driven and dynamically braked and/or frictionally braked. Also, the temporary application of the friction brakes with the dynamic brake control may be effective on any or all of the drive wheel pairs in addition to or in place of the non-driven wheels as described. These and other modifications of the disclosed embodiment as may be encompassed within the broader aspects of the present invention are intended to be included within the scope of the following claims.

We claim:

1. An air operated brake control system for a wheeled vehicle of the type having first and second pairs of wheels, friction brake means for retarding or stopping rotation of at least one of said wheel pairs, said first wheel pair being connected with traction motor means actuable as part of dynamic brake means to retard rotation of said first wheel pair, said dynamic brake means being characterized by a substantial time delay after actuation before effective dynamic braking is developed, said brake control system comprising first pressure air operated actuating means arranged to actuate said friction brake means, second pressure air operated actuating means arranged to actuate said dynamic brake means, a first control valve connected with said first actuating means and operable by the vehicle operator to supply pressure air to said first actuating means to actuate said friction brake means, a second control valve connected with said second actuating means and said first actuating means and operable by the vehicle operator to supply pressure air thereto to respectively actuate said dynamic brake means and said friction brake means, and cutoff means between said second control valve and said first actuating means and automatically operative to exhaust pressure air from said first actuating means after a preset period following actuation thereof by operation of said second control valve.

2. An air operated brake control system for a wheeled vehicle of the type having at least first and second pairs of wheels, each said pair being associated with separately actuable friction brake means for retarding or stopping rotation of its respective wheel pair, said first wheel pair being connected with traction motor means actuable as part of dynamic brake means to retard rotation of said first wheel pair, said dynamic brake means being characterized by a substantial time delay after actuation before effective dynamic braking is developed, said brake control system comprising first and second pressure air operated actuating means arranged to respectively actuate the friction brake means of said first and second wheel pairs, third pressure air operated actuating means arranged to actuate said dynamic brake means, a first control valve connected with said first and second actuating means and operable by the vehicle operator to supply pressure air to said first and second actuating means to actuate the friction brake means of both said wheel pairs, a second control valve connected with said third actuating means and at least one of said first and second actuating means and operable by the vehicle operator to supply pressure air thereto to respectively actuate said dynamic brake means and the friction brake means associated with said one actuating means, and cutoff means between said second control valve and said one actuating means and automatically operative to exhaust pressure air from said one actuating means after a preset period following actuation thereof by operation of said second control valve.

3. The brake control system of claim 2 wherein the preset period for operation of said cutoff means is approximately equal to the period of time delay before effective braking is developed by the dynamic brake means, whereby operation of the second control valve by the operator will provide initial actuation of the friction brake means of at least one of said wheel pairs followed by release of such brake means coincidentally with the development of effective dynamic braking of said first wheel pair so as to provide a substantially continuous braking effect on the vehicle.

4. The brake control system of claim 1 and further comprising a shuttle valve between said first actuating means, said first control valve and said cut off means, said shuttle valve being operative to close off the connection of said first actuating means with whichever one of said cutoff means and said first control valve is then supplying a lower pressure, thereby providing for actuation of said friction brakes upon operation of said first control valve regardless of the operating condition of said second control valve or said cutoff means.

* * * * *